United States Patent [19]  [11] 3,894,206
Suzuki et al.  [45] July 8, 1975

[54] PRESSURE RESPONSIVE SWITCH

[75] Inventors: Masaru Suzuki, Chiryu; Hatuyoshi Yoshida, Nagoya, both of Japan

[73] Assignee: Kabushiki Kaisha Tokai Rika Denki Seisakusho, Japan

[22] Filed: Dec. 13, 1972

[21] Appl. No.: 314,528

[30] Foreign Application Priority Data
Dec. 18, 1971 Japan................................ 46-119892

[52] U.S. Cl................................. 200/85 A; 340/278
[51] Int. Cl. ............................................. H01h 3/14
[58] Field of Search....... 200/86 R, 159 A; 340/272, 340/278; 307/105 B

[56] References Cited
UNITED STATES PATENTS

| 2,929,893 | 3/1960 | Ferry et al. | 200/86 R |
| 3,209,089 | 9/1965 | Weissburg | 200/86 R |
| 3,541,343 | 11/1970 | Butler | 307/10 R |
| 3,749,866 | 7/1973 | Tiazkun et al. | 200/85 A |

Primary Examiner—David Smith, Jr.
Attorney, Agent, or Firm—Craig & Antonelli

[57] ABSTRACT

A pressure responsive switch which essentially comprises a first electro-conductive strip formed with a pair of tongues serving as contact members and a second electro-conductive strip for serving as another contact member, these first and second electro-conductive strips being fastened to each other with a spacer member sandwiched therebetween. When this switch is fluctuated in a predetermined radius of curvature, the contact members served by the tongues which remain substantially unfluctuated contact the second strip to complete an external electrical circuit in which it is inserted.

20 Claims, 5 Drawing Figures

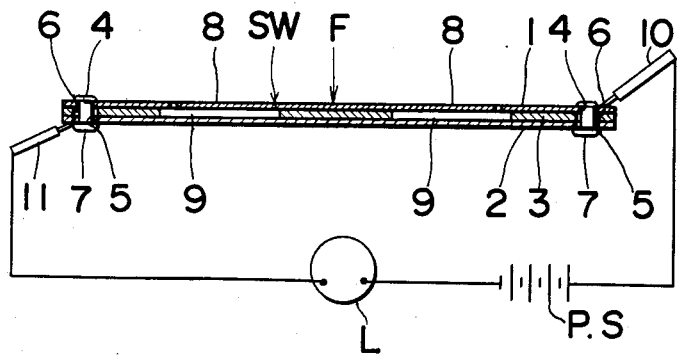
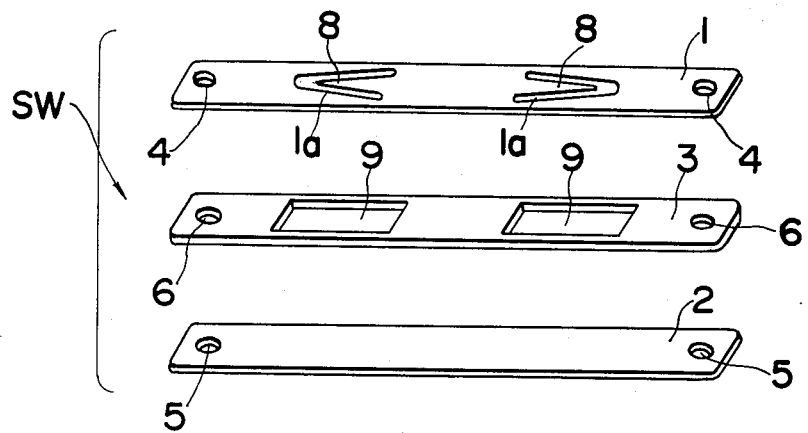
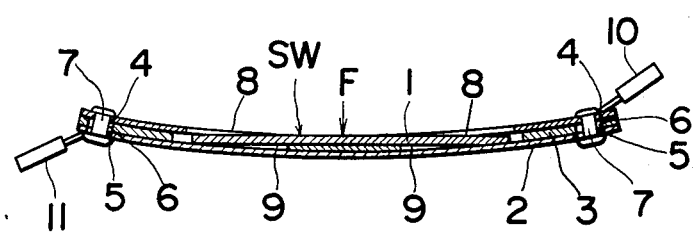
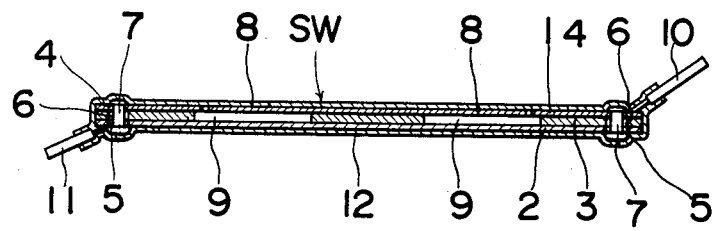
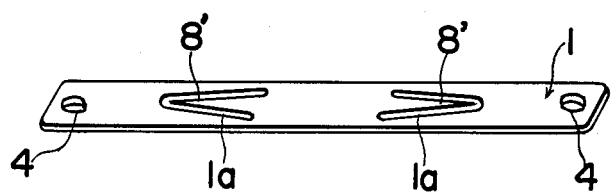

PRESSURE RESPONSIVE SWITCH

The present invention relates to a pressure responsive switch and, more particularly, to a pressure responsive switch capable of operating an electrical circuit, in which it is inserted, depending upon whether or not the assembly of the switch is bent or fluctuated by the application of pressure thereto.

In passager carrying vehicles such as motor bus, air plane and ferry boat or like vehicles, in order to confirm at a remote location how many seats have been occupied by passagers, there is provided a switch installed under each seat which completes an electrical circuit in response to sitting of a passager on one of the seats. The switch particularly used for this purpose and installed under seats must be thin and reliable in operation and has no projecting portions which may obstruct the comfortable sitting.

Accordingly, an essential object of the present invention is to provide a compact pressure responsive switch particularly suitable for use for the above mentioned purpose.

Another object of the present invention is to provide a compact pressure responsive switch which has a relatively small thickness and is, despite of this fact, reliable in operation and durable for a long period of service.

A further object of the present invention is to provide a compact pressure responsive switch which operates an external electrical circuit, in which it is inserted, in response to pressure applied thereto to an extent that said switch is bent or fluctuated.

A still further object of the present invention is to provide a compact pressure responsive switch of simplified construction which can be manufactured at a relatively low cost and has many fields of application.

According to one aspect of the present invention, the pressure sensitive switch essentially comprises three flexible plate members; a first one of which is formed with at least one contact member, a second one of which is made of electrically insulating material and the other of which serves as a fixed contact member, whereby the contact member of the first flexible plate member contacts the fixed contact to complete the external electrical circuit. The contact between the contact member of the first flexible plate member and the fixed contact member or the third flexible plate member is achieved only when the pressure responsive switch itself is fluctuated in a predetermined radius of curvature by the effect of pressure applied thereto.

In view of the fact that the switch closes when it is fluctuated in a predetermined radius of curvature, the switch according to the present invention can be utilized to determine whether or not the pressure applied thereto exceeds a predetermined value.

Another aspect of the present invention resides in that the assembly of the pressure responsive switch is hermetically sealed by a plastic film or similar flexible wrapping material for avoiding the entry of foreign matters.

In any event, these and other objects and features of the present invention will become apparent to those skilled in the art from the following description taken in conjunction with preferred embodiments thereof with reference to the accompanying drawings, in which;

FIG. 1 is a side sectional view of the pressure responsive switch according to one embodiment of the present invention, FIG. 2 is an exploded view of the switch shown in FIG. 1, FIG. 3 is a side sectional view of the pressure responsive switch of FIG. 1 in operation, FIG. 4 is a similar view to FIG. 1, showing another preferred embodiment of the present invention, and FIG. 5 is a perspective view of one of the electrically conductive strips employed in the switch, showing a modification thereof according to a further embodiment of the present invention.

Before the description of the present invention proceeds, it is to be noted that like parts are designated by like reference numerals throughout the accompanying drawings. It is also to be noted that, for better understanding of the present invention, the pressure responsive switch according to the present invention will be described as inserted in an electrical circuit including an electrical lamp and a battery power source seriesconnected therewith.

Referring first to FIGS. 1 to 3, the pressure responsive switch generally indicated by SW comprises a pair of first and second flexible strips, both made of electrically conductive material, which may be of the same rectangular shape, and a flexible spacer 3 which is made of electrically insulating material such as natural rubber, synthetic rubber or like resin and is preferably of the same size as any of said first and second flexible strips 1 and 2.

The first flexible strip 1 is integrally formed with a pair of tongues 8 having respective tips 8a oriented away from each other. Each of these tongues 8 can be formed by grooving or perforating the first flexible strip as at 1a in any suitable method. Preferably, the central point between said tongues 8 substantially coincides with the central point of the flexible strip 1 for the purpose as will become apparent from the later description.

The flexible spacer 3 is integrally formed with a pair of openings 9, preferably of rectangular shape, each of which is so sized as to loosely accommodate therein the corresponding tongue 8 for permitting the latter to contact the flexible strip 2 when the pressure sensitive switch assembly is bent as will be mentioned later.

Each of the first and second flexible strips 1 and 2 and flexible spacer 3 is formed with a pair of spaced holes 4, 5 or 6, respectively, on both end portions thereof. These elements 1, 2 and 3 are stacked together by means of fastening members 7, preferably made of electrically insulating material, extending through said holes 4, 5 and 6 of each pair with the element 3 saidwiched between the other elements 1 and 2. Preferably, the both ends of each of said fastening members 7, which may be in the form of a pin, after having inserted through the corresponding holes 4, 6 and 5, are flatheaded.

A lead wire 10 extending from the positive terminal of the battery power source PS is connected with the first flexible strip in any suitable method such as by means of soldering or inserting it between the first flexible strip and the flat head of the fastening member 7. On the other hand, a lead wire 11 extending from the negative terminal of the battery power source PS through an electric indicator lamp L is connected with the second flexible strip 2 in the same method as employed to connect the lead wire 10 to the strip 1.

In operation, assuming that a force is applied in the direction as indicated by the arrow F in FIG. 1 it is clear that the assembly of the pressure responsive switch SW is bent as shown in FIG. 3. Upon bend of the assembly, i.e., in the condition as shown in FIG. 3, the tongues 8 remain substantially unbent and, therefore, relatively displace from the plane of the first flexible strip 1 with their respective tips 8a contacting one of the opposite surfaces of the second flexible strip 2 which faces towards said tongues 8, completing the electrical circuit shown in FIG. 1 thereby to permitting the lamp L to be lit.

If the external force that has been applied to the assembly is removed, the electrical circuit is immediately opened. This is possible because the assembly once establishing the condition shown in FIG. 3 is tended to restore to the original posture shown in FIG. 1 by the effect of the composite resiliency of these elements 1, 2 and 3 and, therefore, the tips of the tongues 8 that have contacted the surface of the second flexible strip 2 relatively separate away from said surface of said strip 2.

It is to be noted that the second flexible strip 2 that has been described as made of electrically conductive material may be made of electrically insulating material, in which case a metallic foil or like member may be placed on the surface of the strip 2, which faces towards the tongues 8, with the lead wire 11 connected to said metallic foil or like member.

In the embodiment shown in FIG. 4, the assembly constructed as shown in FIG. 1 is hermetically sealed by a plastic 12, which may be any suitable flexible wrapping material, for avoiding the entry of foreign matters into the space between the first and second strips 1 and 2 which may otherwise obstruct the function of the pressure responsive switch SW.

According to a further embodiment of the present invention shown in FIG. 5, the tongues formed in the first flexible strip 1 are each made to represent the isosceles triangle as indicated by 8'. If the tongues are made such as shown in FIG. 5, the natural frequency of each of the tongues can be improved whereby an accidental separation of the tips 8a of the tongues from their contact with the surface of the second flexible strip 2 can be advantageously avoided which may otherwise occur when the switch SW is subjected to vibrations at a frequency smaller than the natural frequency.

Although the present invention has been fully described in conjunction with the preferred embodiments with reference to the accompanying drawings, it is to be noted that various changes and modifications are apparent to those skilled in the art. For example, in view of the fact that the pressure responsive switch according to the present invention operates an electrical circuit, in which it is inserted, depending upon whether or not the assembly of said switch SW is bent or fluctuated, it can be utilized as an instrument for detecting the fluctuation of any movable element or for determining whether or not a predetermined radius of curvature has been attained by an external elements operatively associated with the switch of the present invention.

Accordingly, such changes and modifications should be construed as included within the spirit and scope of the present invention, unless otherwise they depart therefrom.

What is claimed is:
1. A pressure responsive switch comprising
    a first flexible electro-conductive strip means;
    a second flexible electro-conductive strip means;
    a flexible spacer member of electrically insulating material, said spacer member having at least one opening;
    fastening means for connecting said first and second strip means and said spacer member together in a sandwich with said spacer member disposed between said first and second strip means, said fastening means electrically insulating said first and second strip means; and
    at least one contact means having at least a first portion formed integrally with one of said first and second strip means and having at least a second portion freely formed from said one of said first and second strip means for electrically contacting the other of said first and second strip means, said at least one contact means being disposed in the plane of said one of said first and second strip means such that when said first and second strip means are concurrently flexed by a force, said second portion of said at least one contact means remains unflexed and is relatively displaced from a surface of said one of said first and second strip means being concurrently flexed, thereby contacting said other of said first and second strip means through said opening of said flexible spacer member.

2. A pressure responsive switch as claimed in claim 1, wherein said force is in the direction of bending said first and second strip means in a predetermined radius.

3. A pressure responsive switch as claimed in claim 1, wherein an electrical circuit is completed when said at least one contact means contacts said other of said first and second strip means.

4. A pressure responsive switch as claimed in claim 1, wherein said at least one contact means is a tongue member having said first portion formed integrally with said one of said first and second strip means and a remaining portion of said tongue member constituting said second portion of said contact means and being perforated from said one of said first and second strip means.

5. A pressure response switch as claimed in claim 3, wherein said at least one opening in said spacer member is in register with said tongue member so that said tongue member can contact said other of said first and second strip means.

6. A pressure responsive switch as claimed in claim 1, wherein said at least one opening in said spacer member is in register with said at least one contact means so that said contact means can contact said other of said first and second strip means.

7. A pressure responsive switch as claimed in claim 1, wherein said at least one contact means comprises two tongue members, each of which has a portion integral with said one of said first and second strip means and a remaining portion constituting said second portion of said contact means and being perforated from said one of said first and second strip means.

8. A pressure responsive switch as claimed in claim 7, wherein said spacer member has two openings, each of said openings in register with one of said two tongue members.

9. A pressure responsive switch as claimed in claim 1, further comprising a pair of lead wires for external electrical connection, one of said lead wires being connected with said first electro-conductive strip means and the other lead wire with said second electro-conductive strip means and further comprising a elastically deformable covering of electrically insulating material for hermetically sealing said switch.

10. A pressure responsive switch as claimed in claim 1, wherein said at least one contact means is shaped to represent a substantially isosceles triangular shape.

11. A pressure responsive switch as claimed in claim 1, wherein said first and second electro-conductive strips mean and said spacer member are of the same rectangular shape.

12. A pressure responsive switch as claimed in claim 1, wherein said at least one contact means is disposed in the plane of said one of said first and second strip means when said first and second strip means are unflexed, and said at least one contact means remains approximately in said plane when said first and second strip means are concurrently flexed.

13. A pressure responsive switch comprising
a first flexible electro-conductive strip means;
a second flexible electro-conductive strip means;
a flexible spacer member of electrically insulating material, said spacer member having at least one opening;
fastening means for connecting said first and second strip means and said spacer member together in a sandwich with said spacer member disposed between said first and second strip means, said fastening means electrically insulating said first and second strip means; and
at least one contact means having at least a first portion formed integrally with one of said first and second strip means and having at least a second portion freely formed from said one of said first and second strip means for electrically contacting the other of said first and second strip means, said at least one contact means being disposed in the plane of said one of said first and second strip means such that when said first and second strip means are concurrently flexed by a force, said second portion of said at least one contact means remains unflexed and is relatively displaced from the surface of said one of said first and second strip means, thereby contacting the other of said first and second strip means through said opening of said flexible spacer member,
wherein said at least one contact means comprises two tongue members, each of which has a portion integral with said one of said first and second strip means and a remaining portion constituting said second portion of said contact means and being perforated from said one of said first and second strip means,
wherein said spacer member has two openings, each of said openings being in register with one of said two tongue members, and
wherein said portions of each tongue member integral with said one of said first and second strip means are disposed symmetrically about a center point of said one of said first and second strip means.

14. A pressure responsive switch as claimed in claim 1, wherein said other of said first and second strip means is formed of an electrically insulating material with an electro-conductive foil secured to a surface of said other of said first and second strip means facing said one of said first and second strip means.

15. A pressure responsive switch as claimed in claim 13, wherein said force is in the direction of bending of said first and second strip means in a predetermined radius.

16. A pressure responsive switch as claimed in claim 13, wherein an electrical circuit is completed when said at least one contact means contacts said other of said first and second strip means.

17. A pressure responsive switch as claimed in claim 13, wherein said other of said first and second strip means is formed of an electrically insulating material with an electro-conductive foil secured to a surface of said other of said first and second strip means facing said one of said first and second strip means.

18. A pressure responsive switch as claimed in claim 13, further comprising an elastically deformable covering means of electrically insulating material for hermetically sealing said sandwich of first and second strip means and flexible spacer member.

19. A pressure responsive switch as claimed in claim 13, wherein each of said remaining portions perforated from said one of said first and second strip means of each of said two tongue members has a substantially isosceles triangular shape.

20. A pressure responsive switch as claimed in claim 13, wherein said first and second electro-conductive strip means and said spacer member are of the same rectangular shape.

* * * * *